(12) United States Patent
Savonuzzi et al.

(10) Patent No.: US 10,240,017 B2
(45) Date of Patent: Mar. 26, 2019

(54) COMPOSITE PANEL

(75) Inventors: Andrea Savonuzzi, Monaco (MC); Paolo Steinbach, Como (IT)

(73) Assignee: SACO AEI Polymers, Inc., Sheboygan, WI (US)

( * ) Notice: Subject to any disclaimer, the term of this patent is extended or adjusted under 35 U.S.C. 154(b) by 548 days.

(21) Appl. No.: 14/240,015

(22) PCT Filed: Aug. 28, 2012

(86) PCT No.: PCT/US2012/052683
§ 371 (c)(1),
(2), (4) Date: Mar. 25, 2014

(87) PCT Pub. No.: WO2013/033105
PCT Pub. Date: Mar. 7, 2013

(65) Prior Publication Data
US 2014/0205820 A1    Jul. 24, 2014

(30) Foreign Application Priority Data
Aug. 29, 2011 (IT) ............... GE2011A0097

(51) Int. Cl.
*C08J 9/00* (2006.01)
*B32B 5/08* (2006.01)
*B32B 5/18* (2006.01)
*B32B 5/24* (2006.01)
*B32B 5/26* (2006.01)
*B32B 5/28* (2006.01)
*B32B 7/12* (2006.01)

(52) U.S. Cl.
CPC ............ *C08J 9/00* (2013.01); *B32B 5/08* (2013.01); *B32B 5/18* (2013.01); *B32B 5/245* (2013.01); *B32B 5/26* (2013.01); *B32B 5/28* (2013.01);
*B32B 7/12* (2013.01); *B32B 2262/02* (2013.01); *B32B 2262/10* (2013.01); *B32B 2266/025* (2013.01); *B32B 2605/003* (2013.01); *B32B 2605/08* (2013.01); *Y10T 428/24942* (2015.01); *Y10T 442/643* (2015.04); *Y10T 442/644* (2015.04); *Y10T 442/647* (2015.04); *Y10T 442/651* (2015.04); *Y10T 442/652* (2015.04)

(58) Field of Classification Search
CPC .. B32B 5/08; B32B 5/245; B32B 5/26; B32B 5/28; B32B 7/12; B32B 5/18; B32B 2262/02; B32B 2262/10; B32B 2266/025; B32B 2605/003; B32B 2605/08; C08J 9/00; Y10T 428/24942; Y10T 442/651; Y10T 442/644; Y10T 442/652; Y10T 442/643; Y10T 442/647
USPC ........ 428/212, 219; 442/370, 374, 373, 366, 442/367; 156/308.2, 272.2; 521/143
See application file for complete search history.

(56) References Cited

U.S. PATENT DOCUMENTS

| | | |
|---|---|---|
| 4,695,501 A | 9/1987 | Robinson |
| 5,460,870 A | 10/1995 | Arthurs |
| 6,156,682 A | 12/2000 | Fletemier et al. |
| 7,744,150 B2 | 6/2010 | Ariznavarreta Esteban et al. |

(Continued)

*Primary Examiner* — Brian Handville
(74) *Attorney, Agent, or Firm* — Foley & Lardner LLP

(57) ABSTRACT

Composite panel, particularly for forming roof panels of cars and/or industrial vehicles, and method of manufacturing the composite panel, which composite panel includes a core of foamed material, at least one skin layer of nonwoven material, and at least one connecting layer between the core of foamed material and the skin layer of nonwoven material.

34 Claims, 3 Drawing Sheets

(56) References Cited

U.S. PATENT DOCUMENTS

| | | |
|---|---|---|
| 7,759,267 B2 | 7/2010 | Conover et al. |
| 2004/0234744 A1* | 11/2004 | Byma ................. B29B 17/0005 |
| | | 428/304.4 |
| 2004/0235376 A1 | 11/2004 | Byma et al. |
| 2004/0235378 A1 | 11/2004 | Byma et al. |
| 2007/0122602 A1 | 5/2007 | Boeren |
| 2009/0023826 A1 | 1/2009 | Nishimura et al. |
| 2011/0067560 A1* | 3/2011 | Hurst ........................ B32B 5/26 |
| | | 89/36.02 |

* cited by examiner

COMPOSITE PANEL

FIELD OF THE INVENTION

The present invention relates to a composite panel, particularly for forming roof panels of cars and/or industrial vehicles.

BACKGROUND OF THE INVENTION

The panels forming roof panels have to fulfill some requirements in the best possible way, for example must be thin, light, stiff, and inexpensive; must exhibit good waterproofing and sound absorption properties; and must be produced with materials having a low emission of substances that are volatile or potentially harmful to health.

Typically roof panels are composed of composite panels made of polyurethane foams and synthetic or mineral fibers such as glass fibers.

Polyurethane foams however have a relatively low stiffness and, when used as cores for composite panels, require a relatively high thickness, adversely affecting weight and cost of the finished panel.

At the same time mineral or glass fibers, which are used as a reinforcing layer, are a material that is hard to handle, and are potentially hazardous to health, above all when provided in high amounts.

Moreover, the adhesion of the several layers of the panel is generally achieved by using adhesives, which need solvents that can cause over time gas emissions inside the car passenger compartment, increasing health hazards.

Several attempts have been made to obtain high stiffness and mechanical strength for the panels in combination with weights as small as possible. However such attempts have not led to satisfactory solutions, that is, improving and maximizing the ratio of mechanical strength or stiffness to the weight of a composite panel.

U.S. Pat. No. 6,706,370 describes a panel for roof panels of cars that is composed of a core of foamed polyurethane covered on two faces by layers of glass fibers impregnated with resin. The provision of glass-reinforced plastic provides an excellent mechanical strength, but a high weight above all due to glass fibers.

EP 1878568 describes a composite panel with a core composed of two layers a foamed and semi-rigid one and a mat of plastic fibers. The foamed layer is made of foamed polyurethane and the reinforcing layers superimposed on the faces of the core layer comprise glass fibers or other natural or mineral fibers. Even in this case therefore obviously the drawbacks of known panels are present, by which given a certain mechanical strength or stiffness a still relatively high weight is provided.

US 2004/0234744 describes a composite panel having a foamed core made of foamed polyurethane. On the contrary the reinforcing layer or layers are made of mineral fibers, such as for example basalt fibers impregnated with a thermoplastic binder, therefore given a certain stiffness or strength, mineral fibers still lead to a relatively high weight of the panel for types of panels described in the above mentioned documents.

EP 1844927 describes a fiber-reinforced sheet to be used in the automotive field whose core however is not made of foamed material. The reinforcing fibers are of the synthetic, metal, mineral or natural type and therefore they have a certain weight, therefore even in this case the stiffness/weight or mechanical strength/weight ratio is not satisfactory.

WO2006/060881 describes a film made of thermoplastic material reinforced with basalt fibers. This film does not provide a core of foamed material and mineral fibers, particularly basalt fibers are used as reinforcing fibers and therefore it follows the same path followed by the solutions described in the above mentioned documents.

SUMMARY OF THE INVENTION

The present invention aims at overcoming problems in the prior art by providing a composite panel as described hereinbefore, which allows contradictory properties of higher stiffness and lower weight to be harmonized, thus optimizing the ratio of stiffness or mechanical strength of the panel to the weight thereof, further maintaining a high level of the recyclability of the material of the panel.

According to a first characteristic of the present invention, the composite panel, particularly for forming roof panels of cars comprises a core of foamed, cross-linked material, particularly foamed, cross-linked polyolefins and especially foamed, cross-linked polyethylene (PE) (foamed PEX).

Due to the above an improvement in the mechanical strength or stiffness to weight ratio is already achieved in comparison to known panels.

Other characteristics of the invention further improve the panel core and allow the mechanical strength or stiffness to weight ratio to be further improved.

The cross-linked polyethylene has optimal stiffness, lightweight, non-water absorption and sound absorption properties.

In a preferred embodiment, during the step of producing the cross-linked polyethylene, a chemical cross-linking is provided, which is achieved by means of chemical blowing agents activated by temperature.

As an alternative it is possible to provide a physical cross-linking, which is achieved by electron irradiation, allowing a stiffer material to be obtained and with a surface roughness lower than the material obtained by chemical cross-linking, although it is economically more expensive.

The high content of high-density polyethylene, preferably ranging from 20 to 40% allows the stiffness of the core of foamed material and so of the entire panel to increase.

According to a further improvement, the core is covered on at least one face or both of them by a reinforcing layer which reinforcing layer comprises short fibers composed of thermoplastic polymers in place of synthetic and mineral fibers and said fibers being composed of two different thermoplastic polymers that have different softening temperatures, one higher than the other one.

Still according to a further characteristic, fibers are made of the polymer having the higher softening temperature and are in the form of a layer of continuous fibers and/or nonwoven, while the polymer having the lower softening temperature is in the form of a film. Moreover, the difference between the softening temperatures (temperature for the transition to viscoelastic condition) of the two polymers is such that by heating said polymer combination, the polymer with the lower softening temperature "melts" while the polymer with the higher softening temperature maintains its condition and the continuous fibers maintain their shape and/or structure. This means that the polymer having the lower softening temperature occupies, by "pouring" the interstices between the fibers made of the polymer having the higher softening temperature that have maintained the shape and structure and that are thus embedded into the softened polymer having the lower softening temperature. In the cooling condition therefore the reinforcing layer is composed of continuous fibers composed of the thermoplastic material with the higher softening temperature embedded and blocked into the polymer matrix having the lower softening temperature.

Still according to a further characteristic the lower softening temperature ranges from 80 to 120° C., while the higher one is equal to or higher than 230° C.

Still a further optimization of the mechanical strength or stiffness to weight ratio of the composite panel is obtained when in the reinforcing layer the ratio of the polymer having the higher softening temperature to the polymer having the lower softening temperature ranges from 0.6:1 to 1:1.

Although the invention aims at completely eliminating the use of mineral and synthetic fibers in order to reduce the panel weight, when very high mechanical strength or stiffness are required for the structure described above, therefore in particular conditions of use it is possible to combine at least one further layer of fibers that is advantageously interposed between said core of foamed material and said skin layer of nonwoven material.

Advantageously the layer of fibers is composed of non-glass fibers.

Said layers can successively overlap both the faces of the core of foamed material, in symmetric or asymmetric relation to said core of foamed material.

In a further embodiment said connecting layer is composed of a film of thermoadhesive material and/or a layer of plastic material, preferably comprising polyolefins, particularly polypropylene.

In this case, the reinforcing layer comprises a second layer of fibers composed of randomly-oriented fibers in combination with the first layer of unidirectionally-oriented fibers and composed of the thermoplastic polymer, said layer of randomly-oriented fibers and said layer of unidirectionally-oriented fibers being joined together by the film of thermoplastic or thermoadhesive material acting as a connecting layer to form a three-dimensional fiber structure, comprising randomly-oriented fibers in a first side and unidirectionally-oriented fibers in the opposite side.

The unidirectionally-oriented fibers are thermoplastic fibers with the softening temperature higher than the thermoplastic material of the connecting film, while the randomly-oriented fibers are natural, synthetic or mineral fibers and in particular glass fibers or basalt fibers.

This arrangement gives the panel a good bending strength according to several directions defined by the orientation of the unidirectionally-oriented fibers.

The unidirectionally-oriented fibers, even if drawn during the formation of the panel in a mould allow shrinkages of the composite panel to be prevented after the forming and the shape is optimally obtained.

Moreover the use of thermoadhesive or thermoplastic films and generally heat adhesive bonding guarantees an even adhesion and at the same time avoids the drawbacks mentioned above as regards the use of adhesives, solvents and/or volatile and/or odorous substances.

In a further embodiment, the fiber density of said layer of fibers is such to form interstices for the passage of said thermoadhesive material and/or said plastic material once said thermoadhesive material and/or said thermoplastic material have been turned to a viscoelastic condition by heating, so that said thermoadhesive material and/or said thermoplastic material pass through said layer of randomly-oriented fibers and adhere on the one hand to said layer of unidirectionally-oriented thermoplastic fibers and on the other to said core of foamed material.

Thus the transition of the thermoadhesive material or of the thermoplastic material from elastic condition to viscoelastic condition caused by heating is used in order to allow the thermoadhesive material or the thermoplastic material to permeate the layers of fibers passing through the interstices and to allow the layers arranged on opposite sides thereof to adhere and to embed and block the fibers into a material matrix.

This characteristic is particularly advantageous in that it is possible to use only one thermoadhesive film or only one layer of thermoplastic material in order to adhere together the three layers mentioned above and to generate the matrix embedding or impregnating the fibers of the several layers described above.

In a preferred embodiment the connecting film of thermoplastic material is placed, before heating, between the skin layer and the layer of fibers, but it is possible as an alternative to provide the connecting layer to be arranged between the core of foamed material and the layer of fibers.

In a further embodiment there is provided at least one additional layer of plastic material on the additional face of said layer of thermoplastic fibers that does not face towards said core of foamed material.

In this case therefore the layer of thermoplastic fibers for example in the form of nonwoven is embedded between two layers of thermoplastic material, which is softened by heating such to permeate in the nonwoven material during the heat pressing of the panel.

In the panel formed in this way, the thermoplastic fiber of the reinforcing layer is used as a reinforcing fiber, since it is not modified by the heat treatment due to its softening temperature that is higher than that of the thermoplastic material of the film and therefore stiffness remarkably increases due to the action blocking the relative motion between the fibers in case of stress due to the better "wetting" effect of the fibers and to the better adhesion between thermoplastic materials of the film and of the fibers thanks to their chemical/physical compatibility.

As regards mechanical strength or stiffness to weight ratio of the panel, it has been found that when in the reinforcing layer the ratio of the polymer having a higher softening temperature to the polymer having a lower softening temperature ranges from 0.6:1 to 1:1, the blocking action is guaranteed at the greatest extent, giving the panel the highest stiffness level even without the provision of the layers of glass and non-glass reinforcing fibers described in the above pages. The fact of embedding fibers for example in the form of nonwoven between two layers of plastic material further allows shrinkage effects of the panel to be avoided when or after heating it.

In one embodiment said one or more layers of thermoplastic material composing the reinforcing layer each one comprises a multi-layer film composed of at least one polyolefin layer or another polymer with a low heat softening point and at least one layer composed of polymers having a high modulus of elasticity in bending, preferably ranging from 2000 to at least 3500 MPa.

Polyolefin layers have a modulus of elasticity in bending, preferably ranging from 1500 to 2000 MPa.

Advantageously such multi-layer film is overlapped on the layer of thermoplastic fibers, for example in the form of nonwoven, such that the layer of nonwoven material is in contact with the polyolefin layer of the multi-layer film, such to optimize the permeation effect of the thermoplastic material between the fibers of nonwoven material when heat pressing the panel.

At the same time the layer composed of polymers with a high modulus of elasticity in bending further helps in stiffening the panel.

According to one embodiment the reinforcing layer is composed of polyester, particularly polyethylene terephthalate.

In a further improvement the reinforcing layer of thermoplastic fibers in the form of nonwoven is composed of a mat of continuous filaments extruded by a spinneret block, so called spun bond nonwoven.

Although the present invention aims at replacing mineral or glass fibers with thermoplastic fibers it is possible to combine the thermoplastic fibers of the reinforcing layer with glass fibers, at least at one side of the panel when it is required by the application. This may reduce or prevent the nonwoven material from being shrunk in the heating phase.

According to a particularly advantageous embodiment glass fibers are unidirectionally oriented.

According to a further particularly advantageous embodiment even glass fibers are sealed within the skin layer by covering said skin layer with a thermoplastic resin, preferably by spraying.

In a further embodiment the fiber layer is composed of non-glass fibers, particularly basalt fibers or the like.

Basalt fibers are produced by extruding and drawing selected basalt rocks, particularly by melting the basalt mineral at temperatures approximately of 2500° C., and obtaining filaments that once cooled become fibers.

Basalt fibers have a chemical composition and physical properties similar to glass fibers, but advantageously they have a slightly greater modulus of elasticity in bending, they are easier to handle, and contemporaneously they are not hazardous to the health.

In a preferred embodiment the basalt fibers are randomly oriented.

According to a first alternative basalt fibers are arranged such to form a web.

In a further variant the basalt fibers are chopped, known in the art as chop fibers.

In a preferred embodiment the reinforcing layer comprises randomly-oriented basalt fibers and polyester fibers and glass fibers, which glass and polyester fibers are unidirectionally-oriented, said layers of fibers being joined together by said connecting layer or film which is made of thermoadhesive or thermoplastic material such to form a sheet with a three-dimensional fiber structure comprising a first side with randomly-oriented fibers and a second opposite side with unidirectionally-oriented fibers.

In a particularly advantageous embodiment such a sheet can be applied on each face of a core of foamed material such as that previously described and asymmetrically to each other in relation to said core, such that the composite panel obtained will have unidirectional fibers on one face and randomly-oriented fibers on the other one. This is advantageous since one face is intended to be oriented towards the passenger compartment of the car or industrial vehicle, while the other one is intended to be oriented towards the plate.

This asymmetric application allows several advantages to be achieved. Firstly the unidirectional fibers are provided only in the side not directly in contact with the passenger compartment, helping in the panel stiffness, but they cannot be dispersed in large amounts into the passenger compartment, allowing possible adverse effects on the passenger's health to be avoided or at least reduced.

Secondly the three-dimensional fiber structure comprising the unidirectional fibers described above, even if made only on one side of the composite panel, allows the stiffness to increase with the weight being equal.

From the embodiments described above and from the examples described below it is clear that the panel of the present invention allows the use of glass fibers to be avoided or at least drastically reduced while guaranteeing an optimal stiffness.

In a further embodiment bonding agents are provided for the adhesion between said core of foamed material and said connecting layer.

Such bonding agents can be provided on or into any of the layers described above, they being preferably provided in the core of foamed material.

Thus when the thermoadhesive material or the thermoplastic material contacts the core of foamed material, said bonding agents create real chemical bonds between the surfaces of the foamed material and of the thermoadhesive material or of the plastic material, therefore having a high interaction force that guarantees a higher stiffness to the panel, unlike what usually occurs with a mere heating and pressing, wherein the adhesion between the layers is guaranteed by weaker interaction forces.

In one embodiment the total weight is less than 950 g/m$^2$, preferably less than 750 g/m$^2$, particularly less than or equal to 650 g/m$^2$, and the total thickness is less than 6.5 mm, preferably less than 5.5 mm, particularly less than or equal to 4.7 mm and deflection is less than 5 mm, preferably less than 3.5 mm, particularly less than or equal to 2.5 mm.

In a further embodiment the layer of thermoplastic fibers, for example in the form of nonwoven, has a basis weight of less than 150 g/m$^2$, preferably less than 100 g/m$^2$, particularly less than or equal to 90 g/m$^2$, and a thickness of less than 100 µm, particularly less than or equal to 90 µm.

In a further embodiment the core of foamed material has a basis weight of less than 100 g/m$^2$, preferably less than 80 g/m$^2$, particularly less than or equal to 70 g/m$^2$, and a thickness of less than 7 mm, particularly less than 5 mm, preferably less than or equal to 4 mm.

According to a further embodiment the layer of mineral fibers and particularly of basalt ones has a basis weight of less than 140 g/m$^2$ preferably less than 90 g/m$^2$, particularly less than or equal to 60 g/m$^2$, and a thickness of less than 80 µm, preferably less than 60 µm, preferably less than or equal to 40 µm.

In a further embodiment the film of thermoadhesive material has a basis weight of less than 40 g/m$^2$ preferably less than 30 g/m$^2$, particularly less than or equal to 18 g/m$^2$, and a thickness of less than 40 µm, particularly less than 30 µm, preferably less than or equal to 20 µm.

In a still further embodiment the film of thermoplastic material has a basis weight of less than 90 g/m$^2$ preferably less than 70 g/m$^2$, particularly less than or equal to 54 g/m$^2$, and a thickness of less than 100 µm, particularly less than 80 µm, preferably less than or equal to 60 µm.

The present invention further relates to a composite panel, which comprises at least one layer of randomly-oriented fibers and at least one layer of unidirectionally-oriented fibers, said layer of randomly-oriented fibers and said layer of unidirectionally-oriented fibers being joined together by a connecting layer to form a three-dimensional fiber structure comprising randomly-oriented fibers in a first side and unidirectionally oriented fibers in the opposite side.

According to a preferred embodiment said layer of randomly-oriented fibers comprises basalt fibers, said layer of unidirectionally-oriented fibers comprises glass fibers and said connecting layer is composed of a film of thermoadhesive material or a layer of plastic material.

The present invention further relates to a composite panel, which comprises at least one layer of nonwoven material and at least two additional layers of plastic material, said layers of plastic material overlapping said layer of nonwoven material on the opposite sides thereof, and said layer of nonwoven material being composed of fibers having such a density as to form interstices for the passage of plastic material once said plastic material has been turned to the viscoelastic condition by heating, so that said plastic material passes through said layer of nonwoven material and each fiber segment is isolated from contiguous fiber segments by said plastic material.

In one embodiment the layers of plastic material comprise polyolefins, particularly polypropylene.

In a further embodiment the weight of the layers of plastic materials is substantially equal to the weight of said layer of nonwoven material.

According to a further embodiment each of the layers of plastic material comprises a multi-layer film composed of at least one polyolefin layer or another polymer with a low heat softening point and at least one layer composed of polymers having a high modulus of elasticity in bending, preferably ranging from 2000 to at least 3500 MPa.

The present invention further relates to a method of manufacturing a composite panel comprising a core of foamed material, at least one skin layer of nonwoven material and at least one connecting layer between said core of foamed material and said skin layer of nonwoven material, which method provides heating and pressing the layers in overlapping position, so that a transition from elastic condition to viscoelastic condition is caused in said at least one connecting layer for generating adhesion between said core of foamed material and said skin layer of nonwoven material.

It is possible to provide an additional layer of fibers, for example basalt fibers, between the skin layer of nonwoven material and the core of foamed material.

As an alternative or in combination it is possible to provide an arrangement in which the connecting layer is a layer of plastic material, an additional layer of plastic material being further provided on the additional face of the skin layer of nonwoven material that does not face towards the core of foamed material.

Said layers can successively overlap both the faces of the core of foamed material, in symmetric or asymmetric relation to the core of foamed material.

In one embodiment a temperature gradient is generated in the panel perpendicular to the surface of the panel, so that said transition from elastic condition to viscoelastic condition is caused in said at least one connecting layer and/or said skin layer of nonwoven material, and at the same time the internal structure of said core of foamed material is maintained.

This is particularly advantageous since the materials of the different layers of the panel have softening temperatures very different from each other.

The skin layer of nonwoven material, in one embodiment, is composed of polyester, particularly polyethylene terephthalate, which has a softening temperature around 220° C.

At the same time the foamed material, in a preferred embodiment composed of cross-linked polyolefins, particularly cross-linked polyethylene, begins to get deformed at a temperature around 110° C.

Whereas the passage to the viscoelastic condition of the skin layer and of the connecting layer is necessary for guaranteeing an optimal adhesion between the layers, the deformation of the foam is not desirable, since it causes cells to be progressively destroyed, leading to a decrease in stiffness.

The structural integrity of the cells of the core of foamed material is of leading importance for the mechanical stiffness of the core and so of the entire panel, since walls of the cells are a kind of grid of beams, mechanical properties of the structure mainly depending therefrom.

In a preferred embodiment the panel is pressed using plates heated to a temperature ranging from 200° C. to 260° C., particularly 230° C., for a time ranging from 20 s to 50 s, particularly 35 s.

The combination of said temperatures and time guarantees the formation of said temperature gradient, with a higher temperature at the panel surface and a temperature progressively decreasing towards the center of the panel, such that the core of foamed material reaches a temperature not higher than 130° C., therefore not facing a significant destruction of the cells.

In particular the skin layer composed of polyester is turned into still a mainly elastic condition, while the connecting layer of thermoadhesive material or plastic material is turned into a mainly viscous condition.

In an alternative embodiment heating is performed by administering radiations having frequencies in the infrared spectrum.

BRIEF DESCRIPTION OF THE DRAWINGS

These and other characteristics and advantages of the present invention will be more clear from the following description of some non limiting embodiments shown in annexed drawings wherein.

DETAILED DESCRIPTION OF EMBODIMENTS OF THE INVENTION

Figure 1A:
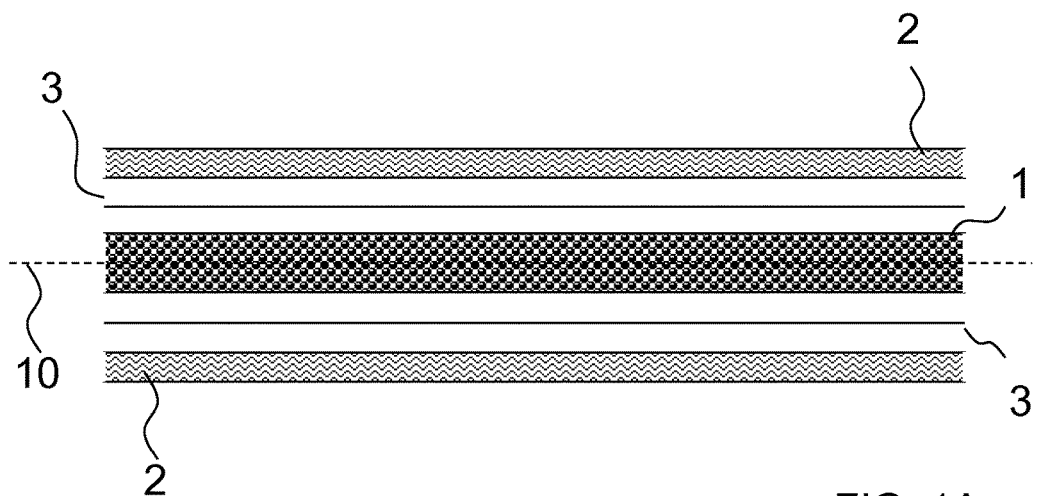
FIG. 1A is a general diagram of a composite panel according to the present invention.

A panel according to the present invention comprises a core of foamed material 1, at least one reinforcing layer composed of a layer of thermoplastic fibers for example in the form of nonwoven 2 and at least one connecting film or layer 3 which is made of thermoplastic material and it is provided between the core of foamed material 1 and the nonwoven layer 2 or as an alternative on the face of the nonwoven layer opposite to the core 1 therefore said nonwoven layer 2 is interposed between the core 1 and the thermoplastic film 3 (FIG. 1 C).

The layers of the panel can successively overlap both the faces of the core of foamed material 1, in symmetric or asymmetric relation to said core of foamed material 1, in particular to the plane 10.

The core of foamed material 1 is composed of cross-linked polyolefin material, particularly cross-linked polyethylene with a high content of high-density polyethylene, preferably ranging from 20 to 40%.

The layer of thermoplastic fibers 2 is composed of polyester, particularly polyethylene terephthalate.

In particular the layer of thermoplastic fibers is in the form of nonwoven and it is composed of a mat of continuous filaments, so called spun bond nonwoven.

Figure 1C:
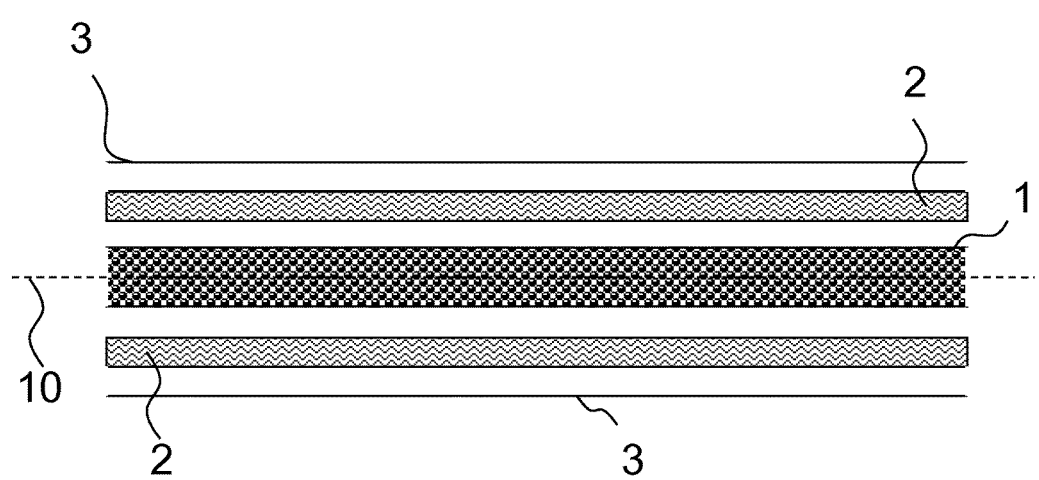
FIG. 1C is a further variant of FIG. 1A.
Figure 1B:
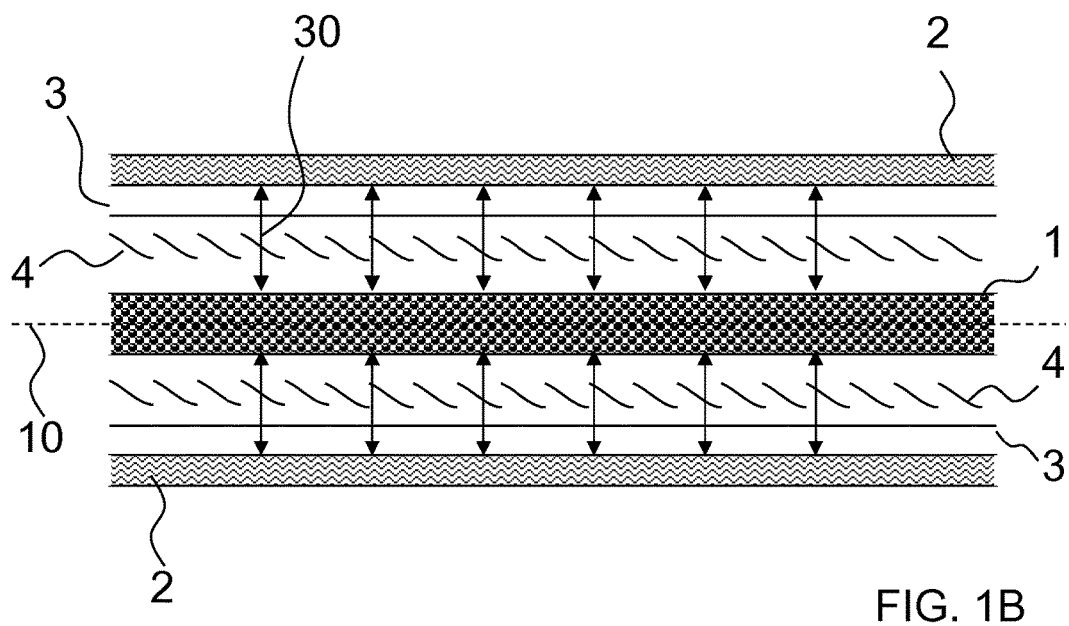
FIG. 1B is a variant embodiment suitable for fields of application wherein a very high mechanical strength is required.

In the embodiment shown in FIG. 1B there is provided a layer of fibers 4 composed of randomly-oriented basalt fibers and arranged between the core of foamed material 1 and the assembly of the layer of thermoplastic fibers 2 and the film 3 in the two possible arrangement variants of FIGS. 1A and 1C.

The nonwoven layer 2 comprises unidirectionally-oriented and preferably continuous polyester fibers and it can possibly further comprise glass fibers, which glass fibers are unidirectionally-oriented.

If the nonwoven layer 2 comprises unidirectionally oriented glass fibers the layer of mineral fibers, that is basalt 4, and said layer of thermoplastic fibers 2 are joined by said connecting film or layer 3 composed of a film of thermoadhesive material or thermoplastic material to form a three-dimensional fiber structure comprising randomly-oriented fibers in a first side and unidirectionally-oriented fibers in the opposite side.

In the layer of fibers 4, the density of basalt fibers is such to form interstices for the passage of the thermoadhesive material or thermoplastic material once said material has been turned to a viscoelastic condition by heating.

Thus the thermoadhesive material or thermoplastic material pass through the layer of fibers 4 and adhere on the one hand to the layer of thermoplastic fibers 2, and on the other to the core of foamed material 1, such as shown by arrows 30.

In the embodiment shown in FIG. 1 the connecting layer 3 composed of the thermoadhesive film or the layer of thermoplastic material is placed between the layer of thermoplastic fibers 2 and the layer of basalt fibers 4, however it is possible to provide as an alternative to place the thermoadhesive film or the layer of plastic material between the core of foamed material 1 and the layer of basalt fibers 4.

Advantageously the thermoplastic fibers of the nonwoven layer 2 are composed of a thermoplastic polymer having a softening temperature higher than the softening temperature of the thermoplastic polymer or thermoadhesive material of the connecting film 3, therefore by applying heating for softening or "melting" the material of the connecting film 3, thermoplastic fibers of the layer 2 maintain their shape and structure behaving as natural or mineral fibers and are embedded in the polymer of the film 3 that in the "melted" condition "wets" these fibers generating an embedding matrix that in the cooled condition embeds them and blocks them together and in relation to the matrix. As already highlighted above this action allows the best chemical/physical compatibility to be provided between fibers and impregnation or embedding matrix, therefore the mechanical connection between fibers and thermoplastic material containing them is the highest one, while it avoids using relatively heavy mineral or synthetic fibers, improving the mechanical strength and reducing the weight.

The softening temperature of the film preferably ranges from 80 to 120° C. and that of thermoplastic fibers of the layer 2 is equal to or higher than 230° C.

An embodiment provides the core to be composed of cross-linked foamed PE, preferably chemically cross-linked.

Advantageously the core has a content of high-density PE (HDPE) ranging from 20 to 40% by weight of the total weight of the core 1.

As regards thermoplastic material of the layer of fibers 2 and of the film 3 for obtaining the best stiffness to weight ratio, in the reinforcing layer the ratio of polymer having a higher softening temperature to the polymer having a lower softening temperature ranges from 0.6:1 to 1:1.

The film of thermoplastic material (3) is advantageously a multi-layer film composed of at least one polyolefin layer or the like and at least one layer composed of polymers with a high modulus of elasticity in bending, preferably ranging from 2000 to at least 3500 MPa.

The layer of thermoplastic fibers is preferably a layer of unidirectionally-oriented fibers and it is composed of polyester, particularly polyethylene terephthalate.

The arrangement of the panel according to the general diagram shown in FIG. 1 is applicable to the several examples described below.

Example 1A

Panel symmetric in relation to plane 10 in the order from the center to the outside of the panel composed of:

a core of foamed material 1 made of cross-linked polyethylene with a high content of high-density polyethylene with basis weight of 70 g/m$^2$ and thickness of 4 mm;

a reinforcing layer on each side of the core 1 comprising a connecting layer 3 composed of a thermoadhesive or thermoplastic film with basis weight of 18 g/m$^2$ and thickness of 20 μm;

a layer of thermoplastic fibers in the form of nonwoven 2 composed of polyethylene terephthalate with basis weight of 90 g/m$^2$.

Such panel has a total weight of 286 g/m$^2$, a total thickness of 4.7 mm and it has deflection values ranging from 2.5 to 3.5 mm.

Example 1B

Panel symmetric in relation to plane 10 in the order from the center to the outside of the panel composed of:

a core of foamed material 1 made of cross-linked polyethylene with a high content of high-density polyethylene with basis weight of 70 g/m$^2$ and thickness of 4 mm;

a layer of fibers 4 composed of a web of basalt fibers with basis weight of 60 g/m$^2$;

a connecting layer 3 composed of a thermoadhesive film with basis weight of 18 g/m$^2$ and thickness of 20 μm;

a skin layer of nonwoven material 2 composed of polyethylene terephthalate and reinforced with unidirectionally-oriented glass fibers with basis weight of 90 g/m$^2$.

Such panel has a total weight of 616 g/m$^2$, a total thickness of 4.7 mm and it has deflection values ranging from 2.5 to 3.5 mm.

Example 2

Panel asymmetric in relation to plane 10 composed of:

a core of foamed material 1 made of cross-linked polyethylene with a high content of high-density polyethylene with basis weight of 70 g/m$^2$ and thickness of 4 mm;

and on a first side of the core of foamed material 1, in the order from the center to the outside of the panel, it is composed of:

a layer of fibers 4 composed of a web of basalt fibers with basis weight of 60 g/m²;

a connecting layer 3 composed of a thermoadhesive film with basis weight of 18 g/m² and thickness of 20 μm;

a skin layer of nonwoven material 2 composed of polyethylene terephthalate and reinforced with unidirectionally-oriented glass fibers, with basis weight of 90 g/m².

and on the opposite side of the core of foamed material 1, in the order from the center to the outside of the panel, it is composed of:

a layer of fibers 4 composed of chopped basalt fibers with basis weight of 90 g/m²;

a connecting layer 3 composed of a layer of plastic material, particularly polypropylene, with basis weight of 54 g/m² and thickness of 60 μm;

a skin layer of nonwoven material 2 composed of polyethylene terephthalate and reinforced with unidirectionally-oriented glass fibers, with basis weight of 90 g/m².

Such panel has a total weight of 682 g/m², a total thickness of 4.7 mm and it has deflection values ranging from 3.5 to 4.0 mm with load placed on the side comprising the web of basalt fibers.

Example 3

Panel symmetric in relation to plane 10 in the order from the center to the outside of the panel composed of:

a core of foamed material 1 made of cross-linked polyethylene with a high content of high-density polyethylene with basis weight of 70 g/m² and thickness of 4 mm;

a layer of fibers 4 composed of chopped basalt fibers with basis weight of 90 g/m²;

a connecting layer 3 composed of a layer of plastic material, particularly polypropylene, with basis weight of 54 g/m² and thickness of 60 μm;

a skin layer of nonwoven material 2 composed of polyethylene terephthalate and reinforced with unidirectionally-oriented glass fibers with basis weight of 90 g/m².

Such panel has a total weight of 818 g/m², a total thickness of 4.7 mm and it has deflection values of about 3.0 mm.

Example 4

Panel symmetric in relation to plane 10 in the order from the center to the outside of the panel composed of:

a core of foamed material 1 made of cross-linked polyethylene with a high content of high-density polyethylene with thickness of 4.7 mm;

a layer of fibers 4 composed of a web of basalt fibers with basis weight of 60 g/m²;

a connecting layer 3 composed of a thermoadhesive film with basis weight of 18 g/m² and thickness of 20 μm;

a skin layer of nonwoven material 2 composed of polyethylene terephthalate and reinforced with unidirectionally-oriented glass fibers with basis weight of 90 g/m².

Such panel has a total thickness of 6 mm and it has deflection values of about 2.0 mm.

Example 5

Panel asymmetric in relation to plane 10 composed of:

a core of foamed material 1 made of cross-linked polyethylene with a high content of high-density polyethylene with basis weight of 70 g/m² and thickness of 4 mm;

and on a first side of the core of foamed material 1, in the order from the center to the outside of the panel it is composed of:

a layer of fibers 4 composed of a web of basalt fibers with basis weight of 60 g/m²;

a connecting layer 3 composed of a thermoadhesive film with basis weight of 18 g/m² and thickness of 20 μm;

a skin layer of nonwoven material 2 composed of polyethylene terephthalate and reinforced with unidirectionally-oriented glass fibers, with basis weight of 90 g/m².

and on the opposite side of the core of foamed material 1, in the order from the center to the outside of the panel, it is composed of:

a layer of fibers 4 composed of a web of basalt fibers with basis weight of 60 g/m²;

a connecting layer 3 composed of a thermoadhesive film with basis weight of 18 g/m² and thickness of 20 μm;

a skin layer of nonwoven material 2 composed of polyethylene terephthalate, not reinforced with glass fibers, with basis weight of 100 g/m²;

Such panel has a total weight of 626 g/m², a total thickness of 4.7 mm and it has deflection values ranging from 3.5 to 4.0 mm with load placed on both the sides.

Figure 2:
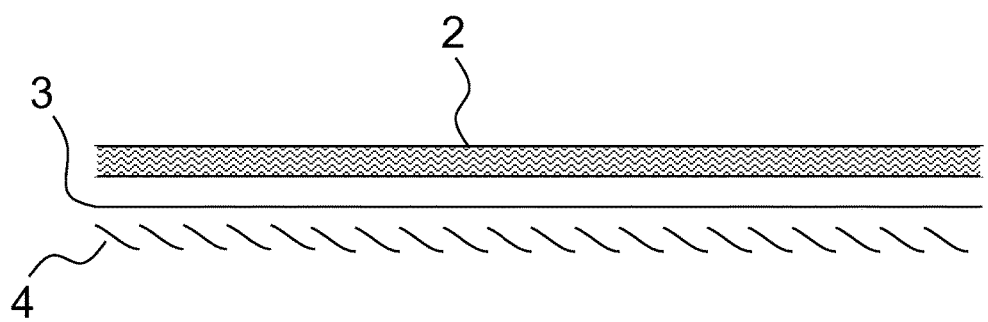
FIG. 2 is a diagram of an intermediate product comprising layers with randomly-oriented and unidirectionally-oriented fibers respectively.

FIG. 2 shows a diagram of an intermediate product comprising a layer of randomly-oriented fibers 4 and a layer of unidirectionally-oriented fibers 2.

The layer of randomly-oriented fibers 4 and the layer of unidirectionally-oriented fibers 2 are joined by a connecting layer 3 to form a three-dimensional fiber structure comprising randomly-oriented fibers on a first side and unidirectionally-oriented fibers in the opposite side.

The layer of randomly-oriented fibers 4 comprises basalt fibers, the layer of unidirectionally-oriented fibers 2 comprises glass fibers and said connecting layer 3 is composed of a film of thermoadhesive material or a layer of plastic material, preferably as described in the above examples with reference to FIG. 1.

Such intermediate product can be used alone or in combination with additional layers of any type, particularly in the arrangement shown in FIG. 1.

Figure 3:
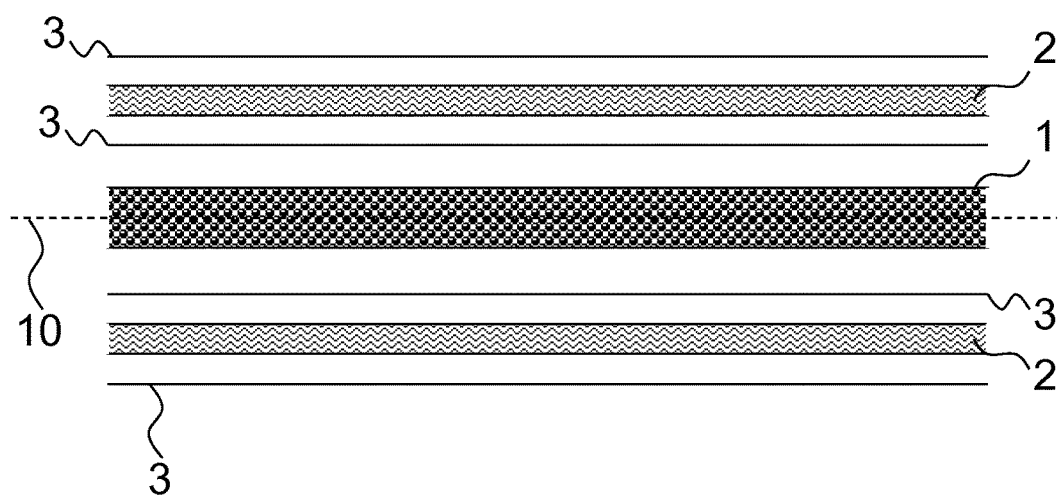
FIG. 3 is a general diagram of many embodiments, wherein the layer of nonwoven material is between two layers of plastic material.

FIG. 3 shows the general diagram of a further embodiment, wherein the connecting layer 3 is composed of a layer of plastic material, preferably comprising polyolefins, particularly polypropylene.

An additional layer of plastic material 3 can be provided on the additional face of the layer of thermoplastic fibers in the form for example of nonwoven 2 which does not face towards the core of foamed material 1, such that the nonwoven layer 2 is embedded between two connecting layers or films 3 of thermoplastic material, which thermoplastic material, by heating, is softened such to permeate between the thermoplastic fibers in the nonwoven when heat pressing the panel, said fibers having a softening temperature higher than that of the thermoplastic material of the film 3.

The total weight of the connecting layers 3 of plastic material is substantially equal to the weight of the skin layer 2 or anyway preferably ranging from 0.6:1 to 1:1 ratio of polymer of fibers of the nonwoven 2 having the higher softening temperature to the polymer of the film 3 having the lower softening temperature.

The connecting layers or films 3 of thermoplastic material can each one comprise a multi-layer film composed of at least one polyolefin layer or another polymer with a low heat softening point and at least one layer composed of polymers with a high modulus of elasticity in bending, preferably ranging from 2000 to at least 3500 MPa.

The arrangement of the panel according to the general diagram shown in FIG. 3 is applicable to the several examples described below.

Example 6

Panel symmetric in relation to the plane 10 in the order from the center to the outside of the panel composed of:
a core of foamed material 1 made of cross-linked polyethylene with a high content of high-density polyethylene with basis weight of 70 g/m² and thickness of 4 mm;
a first connecting layer 3 composed of a layer of thermoplastic material, particularly polypropylene, with basis weight of 54 g/m² and thickness of 60 μm;
a layer 2 of unidirectionally-oriented thermoplastic fibers and for example in the form of nonwoven said fibers being made of polyethylene terephthalate and said layer being reinforced by adding unidirectionally-oriented glass fibers with basis weight of 90 g/m²;
a second connecting layer 3 composed of a layer of plastic material, particularly polypropylene, with basis weight of 54 g/m² and thickness of 60 μm;
Such panel has a total weight of 676 g/m², a total thickness ranging from 4.9 mm to 5.3 mm and it has deflection values of about 4.5 mm.

Example 7

Panel symmetric in relation to the plane 10 in the order from the center to the outside of the panel composed of:
a core of foamed material 1 made of cross-linked polyethylene with a high content of high-density polyethylene with basis weight of 80 g/m² e thickness of 5 mm;
a first connecting layer or film 3 composed of a layer of thermoplastic material, particularly polypropylene, with basis weight of 54 g/m² and thickness of 60 μm;
a layer 2 of thermoplastic fibers for example in the form of nonwoven which thermoplastic fibers are composed of polyethylene terephthalate and the fibers being unidirectionally-oriented, moreover the layer being further reinforced by unidirectionally-oriented glass fibers with basis weight of 90 g/m².
a second connecting layer or film 3 composed of a layer of thermoplastic material, particularly polypropylene, with basis weight of 54 g/m² and thickness of 60 μm;
Such panel has a total weight of 796 g/m², a total thickness ranging from 5.9 mm to 6.2 mm and it has deflection values ranging from 3.0 to 4.0 mm.

Example 8

Panel asymmetric in relation to plane 10 composed of:
a core of foamed material 1 made of cross-linked polyethylene with a high content of high-density polyethylene with basis weight of 80 g/m² and thickness of 5 mm;
and on a first side of the core of foamed material 1, in the order from the center to the outside of the panel, it is composed of:
a first connecting layer or film 3 composed of a layer of plastic material, particularly polypropylene, with basis weight of 54 g/m² and thickness of 60 μm;
a layer 2 of thermoplastic fibers for example in the form of nonwoven whose fibers are composed of polyethylene terephthalate and are unidirectionally-oriented while said layer is reinforced with unidirectionally-oriented glass fibers, with basis weight of 90 g/m².

a second connecting layer or film 3 composed of a layer of thermoplastic material, in particular polypropylene, with basis weight of 54 g/m² and thickness of 60 μm;
and on the opposite side of the core of foamed material 1, in the order from the center to the outside of the panel, it is composed of:
a first connecting layer or film 3 composed of a layer of plastic material, particularly polypropylene, with basis weight of 54 g/m² and thickness of 60 μm;
a layer 2 of thermoplastic fibers for example in the form of nonwoven whose fibers are composed of polyethylene terephthalate and are unidirectionally-oriented while said layer is not reinforced with glass fibers and it has a basis weight of 100 g/m²;
a second connecting film or layer 3 composed of a layer of plastic material, particularly polypropylene, with basis weight of 54 g/m² and thickness of 60 μm.
Such panel has a total weight of 806 g/m², a total thickness ranging from 5.9 to 6.2 mm and it has deflection values of about 4.0 mm.

It has to be noted that the examples described above can be modified such to provide on one of the two sides of the core or on both of them identical or different reinforcing layers and that is layers 2 of thermoplastic fibers in the form of nonwoven both reinforced with glass fibers and not reinforced with glass fibers, combined such to form panels symmetric or asymmetric in relation to plane 10.

In a preferred embodiment glass fibers are spaced from each other by 5-10 mm.

In particular the layer 2 of thermoplastic fibers for example in the form of nonwoven is composed of polyethylene terephthalate fiber, either virgin or regenerated, with a basis weight ranging from 90 to 100 g/m², while for each skin layer 2 there are provided two layers of plastic material 3 with a basis weight ranging from 50 to 60 g/m², thus observing the ratio by weight of the nonwoven material to the plastic material of about 1:1.

Figure 4:
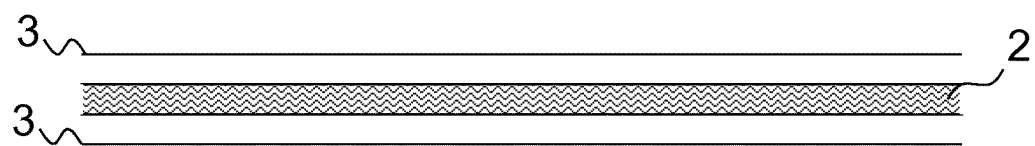
FIG. 4 is a diagram of an intermediate product composed of a layer of nonwoven material between two layers of plastic material.

FIG. 4 shows a diagram of an intermediate product composed of a layer of thermoplastic fibers, for example in the form of nonwoven 2, and at least two additional layers of thermoplastic material 3.

The layers of thermoplastic material 3 overlap the layer 2 of thermoplastic fibers for example in the form of nonwoven on the opposite sides thereof.

The layer 2 of thermoplastic fibers for example in the form of nonwoven is composed of fibers, preferably unidirectionally-oriented and possibly continuous ones, with such a density as to form interstices for the passage of the thermoplastic material of the film 3 of thermoplastic material, once said plastic material has been turned to the viscoelastic condition by heating, so that said thermoplastic material passes through said layer 2 of thermoplastic fibers and each fiber segment is isolated from contiguous fiber segments by said thermoplastic material and it is anyway blocked in position in the matrix of thermoplastic material once it becomes cold.

Such intermediate product can be used alone or in combination with additional layers of any type, in particular in the arrangement shown in FIG. 3.

The invention claimed is:
1. Composite panel comprising: a core layer, which comprises cross-linked foamed polyolefin; wherein the cross-linked foamed polyolefin comprises high-density polyethylene (HDPE); and
a reinforcing layer on at least one of two faces of the core layer, wherein the reinforcing layer comprises a first non-woven layer comprising unidirectionally-oriented continuous thermoplastic polyester fibers and a non-woven web of randomly-oriented fibers; and the first non-woven layer and the non-woven web are joined together by at least one layer comprising a second thermoplastic polymer, which has a lower softening temperature than a first softening temperature of the unidirectionally-oriented continuous thermoplastic polymer fibers, such that the reinforcing layer is in the form of a sheet having said layers of fibers joined together by the second thermoplastic polymer with a three-dimensional fiber structure comprising a first side with randomly-oriented fibers and a second opposite side with unidirectionally-oriented fibers; and the composite panel has a total weight of less than 950 g/m$^2$, a total thickness of less than 6.5 mm and a deflection value of less than 5 mm.

2. The composite panel according to claim 1, wherein said core layer comprises the HDPE in an amount ranging from 20 to 40% by weight of total weight of the core layer.

3. The composite panel according to claim 1, wherein the softening temperature of the second thermoplastic polymer ranges from 80 to 120° C. and the first softening temperature is at least 230° C.

4. The composite panel according to claim 1, wherein the reinforcing layer has a weight ratio of the unidirectionally-oriented continuous thermoplastic polyester fibers to the second thermoplastic polymer of 0.6:1 to 1:1.

5. The composite panel according to claim 1, comprising one or more of said reinforcing layers successively overlapped on both faces of said core layer.

6. The composite panel according to claim 1, wherein the unidirectionally-oriented continuous thermoplastic polyester fibers and the randomly-oriented fibers are embedded into a matrix of the second thermoplastic polymer.

7. The composite panel of claim 6, wherein the matrix of the second thermoplastic polymer adheres to the core layer.

8. The composite panel according to claim 1, further comprising an additional layer of a plastic material on an additional face of said first layer of unidirectionally-oriented fibers that does not face towards said core layer.

9. The composite panel according to claim 1, wherein the unidirectionally-oriented continuous thermoplastic polyester fibers comprise polyethylene terephthalate fibers.

10. The composite panel according to claim 1, wherein said first non-woven layer further comprises glass fibers.

11. The composite panel according to claim 10, wherein said glass fibers are sealed within said first non-woven layer by covering said first non-woven layer with a thermoplastic resin.

12. The composite panel according to claim 7, wherein the randomly-oriented fibers comprise basalt fibers.

13. The composite panel according to claim 12, wherein said basalt fibers are chopped.

14. The composite panel according to claim 12, wherein and said first non-woven layer comprises polyester fibers and glass fibers, said first non-woven layer and said non-woven web being joined together by the second thermoplastic polymer to form a three-dimensional fiber structure comprising randomly-oriented fibers on a first side and unidirectionally-oriented fibers on an opposite side.

15. The composite panel according to claim 1, wherein the at least one of the reinforcing layers successively overlap both faces of said core layer; each first non-woven layer being covered on a side that does not face towards said core layer with the non-woven web, the first non-woven layer and the non-woven web layers in the reinforcing layer on both sides of said core layer being joined together and to the core layer by the second thermoplastic polymer.

16. The composite panel according to claim 6, further comprising a bonding agent for adhesion between said core layer and said second thermoplastic polymer.

17. The composite panel according to claim 1, wherein said core layer has a basis weight of less than 100 g/m$^2$; the first non-woven layer has a basis weight of less than 150 g/m$^2$; and the non-woven web has a basis weight of less than 140 g/m$^2$.

18. The composite panel according to claim 1, wherein the layer comprising the second thermoplastic polymer has a basis weight of less than 70 g/m$^2$.

19. The composite panel according to claim 1, wherein said second thermoplastic polymer comprises a polyolefin.

20. The composite panel of claim 6, wherein the reinforcing layer comprises a layer of unidirectionally-oriented, continuous polyester fibers embedded into the polymer matrix, which includes thermoplastic polyolefin; wherein the thermoplastic polyolefin is adhered to the core layer.

21. The composite panel of claim 20 wherein the cross-linked foamed polyolefin comprises 20 to 40% by weight of the HDPE; the polyester fibers comprise polyethylene terephthalate fibers; and the thermoplastic polyolefin comprises polypropylene.

22. The composite panel of claim 1, wherein the reinforcing layer comprises a second layer including randomly-oriented basalt fibers and the first non-woven layer including unidirectionally-oriented thermoplastic polyester fibers reinforced with unidirectionally-oriented glass fibers.

23. The composite panel of claim 22 wherein the thermoplastic polyester fibers and glass fibers are embedded into a polymer matrix of the second thermoplastic polymer; and the polymer matrix is adhered to the core layer.

24. The composite panel of claim 22 wherein the polyester fibers comprise polyethylene terephthalate fibers; the thermoplastic polyolefin comprises polypropylene; and the core layer comprises the HDPE in an amount ranging from 20 to 40% by weight of total weight of the core layer.

25. Composite panel comprising: a cross-linked foamed polyolefin core layer; and a reinforcing layer on at least one of two faces of the core layer, the reinforcing layer comprising a first non-woven layer, which comprises unidirectionally-oriented continuous thermoplastic polyester fibers reinforced with unidirectionally-oriented glass fibers, and a non-woven web of randomly-oriented fibers;

wherein the first non-woven layer and the non-woven web are embedded into a matrix of a second thermoplastic polymer having a lower softening temperature than the softening temperature of the unidirectionally-oriented continuous thermoplastic polyester fibers; and the composite panel has a total weight of less than 950 g/m$^2$, a total thickness of less than 6.5 mm and a deflection value of less than 5 mm.

26. The composite panel of claim 25, comprising one or more of the reinforcing layers successively overlapped on both faces of the core layer.

27. The composite panel of claim 25, wherein the composite panel a deflection value of less than 3.5 mm.

28. The composite panel of claim 27, wherein the thermoplastic polyester fibers have a softening temperature of at least 230° C.

29. The composite panel of claim 25, wherein the cross-linked foamed polyolefin comprises 20 to 40% by weight high-density polyethylene (HDPE) and the core layer has a basis weight of less than 100 g/m$^2$; the first non-woven layer has a basis weight of less than 150 g/m²; and the non-woven web has a basis weight of less than 140 g/m².

30. The composite panel of claim 25, wherein the unidirectionally-oriented continuous thermoplastic polyester fibers comprise polyethylene terephthalate fibers; and the second thermoplastic polymer comprises polypropylene.

31. Composite panel comprising: a cross-linked foamed polyolefin core layer, which comprises 20 to 40 wt. % HDPE and has a basis weight of less than 100 g/m²; and
 a reinforcing layer on at least one of two faces of the core layer,
 the reinforcing layer comprising a non-woven layer, which has a basis weight of less than 150 g/m² and comprises unidirectionally-oriented continuous thermoplastic polyester fibers reinforced with unidirectionally-oriented glass fibers, and a non-woven web of randomly-oriented fibers having a basis weight of less than 140 g/m²;
 wherein the first non-woven layer and the non-woven web are embedded into a thermoplastic polyolefin matrix adhered to the core layer; and
 the composite panel has a total weight of less than 950 g/m², a total thickness of less than 6.5 mm and a deflection value of less than 5 mm.

32. The composite panel of claim 31, wherein the thermoplastic polyolefin matrix comprises polypropylene, the thermoplastic polyester fibers comprise polyethylene terephthalate fibers; and the randomly-oriented fibers comprise basalt fibers.

33. The composite panel of claim 31, wherein the each reinforcing layer is in the form of a sheet having said layers of fibers joined together by the thermoplastic polyolefin matrix to form a three-dimensional fiber structure comprising a first side with randomly-oriented fibers and a second opposite side with unidirectionally-oriented fibers.

34. The composite panel of claim 33, wherein the composite panel has a reinforcing layer adhered to each face of the core layer such that the first side of the reinforcing layer with the randomly-oriented fibers facing towards the core layer.

* * * * *